(12) United States Patent
Zhang et al.

(10) Patent No.: US 11,445,400 B2
(45) Date of Patent: Sep. 13, 2022

(54) ENERGY-EFFICIENT OPTIMIZED COMPUTING OFFLOADING METHOD FOR VEHICULAR EDGE COMPUTING NETWORK AND SYSTEM THEREOF

(71) Applicant: NANTONG UNIVERSITY, Jiangsu (CN)

(72) Inventors: Guoan Zhang, Jiangsu (CN); Xiaohui Gu, Jiangsu (CN); Li Jin, Jiangsu (CN); Jinyuan Gu, Jiangsu (CN); Chen Ji, Jiangsu (CN); Yancheng Ji, Jiangsu (CN); Wei Duan, Jiangsu (CN)

(73) Assignee: NANTONG UNIVERSITY, Jiangsu (CN)

( * ) Notice: Subject to any disclaimer, the term of this patent is extended or adjusted under 35 U.S.C. 154(b) by 0 days.

(21) Appl. No.: 17/437,120

(22) PCT Filed: Aug. 4, 2020

(86) PCT No.: PCT/CN2020/106730
§ 371 (c)(1),
(2) Date: Sep. 8, 2021

(87) PCT Pub. No.: WO2022/011755
PCT Pub. Date: Jan. 20, 2022

(65) Prior Publication Data
US 2022/0210686 A1    Jun. 30, 2022

(30) Foreign Application Priority Data
Jul. 15, 2020    (CN) .......................... 202010678857.4

(51) Int. Cl.
*H04W 28/02*    (2009.01)
*H04W 4/40*    (2018.01)
*H04W 28/22*    (2009.01)

(52) U.S. Cl.
CPC ......... *H04W 28/0226* (2013.01); *H04W 4/40* (2018.02); *H04W 28/22* (2013.01)

(58) Field of Classification Search
CPC .... H04W 28/0226; H04W 4/40; H04W 28/22
See application file for complete search history.

(56) References Cited

U.S. PATENT DOCUMENTS

2011/0019693 A1    1/2011    Fu et al.
2018/0115357 A1*   4/2018    Park ....................... H04L 5/0057
(Continued)

FOREIGN PATENT DOCUMENTS

CN    107995660 A    5/2018
CN    108934002 A    12/2018
(Continued)

OTHER PUBLICATIONS

Notification to Grant Patent Right for Invention (with English translation) issued in corresponding Chinese Patent Application No. 202010678857.4 dated Aug. 9, 2021, 3 pages.
(Continued)

*Primary Examiner* — Mehmood B. Khan
(74) *Attorney, Agent, or Firm* — MH2 Technology Law Group, LLP

(57) ABSTRACT

The present disclosure relates to an energy-efficient optimized computing offloading method for a vehicular edge computing network and a system thereof; the method comprises: calculating the energy efficiency cost EEC of local computing; calculating the energy efficiency cost EEC of mobile edge computing; determining an optimal offloading decision based on the energy efficiency cost of local computing and the energy efficiency cost of mobile edge computing; determining an optimal CPU frequency and an optimal transmit power of the vehicle based on the optimal offloading decision; and determining the optimal offloading
(Continued)

time of the vehicle based on the optimal CPU frequency and the optimal transmit power of the vehicle. The method of the present disclosure can improve the computing offloading efficiency.

5 Claims, 11 Drawing Sheets

(56) References Cited

U.S. PATENT DOCUMENTS

| | | | | |
|---|---|---|---|---|
| 2018/0351652 | A1* | 12/2018 | Ashrafi | H04L 41/142 |
| 2020/0220801 | A1 | 7/2020 | Ferguson et al. | |
| 2020/0343985 | A1* | 10/2020 | O'Shea | G06N 20/00 |

FOREIGN PATENT DOCUMENTS

| | | | | |
|---|---|---|---|---|
| CN | 109067842 | A | 12/2018 | |
| CN | 109302709 | A | 2/2019 | |
| CN | 109413615 | A | 3/2019 | |
| CN | 109767117 | A | 5/2019 | |
| CN | 109862086 | A | 6/2019 | |
| CN | 109922479 | A | 6/2019 | |
| CN | 110035410 | A | 7/2019 | |
| CN | 110377353 | A | 10/2019 | |
| CN | 110505644 | A | 11/2019 | |
| CN | 110941667 | A | 3/2020 | |
| CN | 111132077 | A | 5/2020 | |
| CN | 111200831 | A | 5/2020 | |
| CN | 111343598 | A | 6/2020 | |
| CN | 111372314 | A | 7/2020 | |
| DE | 112018003399 | T5 * | 3/2020 | H04W 12/069 |
| WO | WO-2022027014 | A1 * | 2/2022 | |

OTHER PUBLICATIONS

International Search Report dated Mar. 29, 2021 for International Application No. PCT/CN2020/106730, 4 pages.
First Search (with English translation) issued in Chinese Patent Application No. 202010678857.4 dated Mar. 16, 2021, 2 pages.
First Office Action (with English translation) issued in Chinese Patent Application No. 202010678857.4 dated Mar. 24, 2021, 12 pages.
Second Office Action (with English translation) issued in Chinese Patent Application No. 202010678857.4 dated Jun. 15, 2021, 8 pages.
Dinh et al., "Offloading in Mobile Edge Computing: Task Allocation and Computational Frequency Scaling," IEEE Transactions On Communications, Aug. 2017, vol. 65, No. 8, pp. 3571-3584.
Guo et al., "Energy-Efficient Dynamic Computation Offloading and Cooperative Task Scheduling in Mobile Cloud Computing," IEEE Transactions on Mobile Computing, Feb. 2019, vol. 18, No. 2, pp. 319-333.
Le et al., "Efficient Resource Allocation in Mobile-edge Computation Offloading: Completion Time Minimization," 2017 EEE International Symposium on Information Theory (ISIT), 2017, pp. 2513-2517.
Liang et al., "Resource Allocation for D2D-Enabled Vehicular Communications," IEEE Transactions on Communications, Jul. 2017, vol. 65, No. 7, pp. 3186-3197.
Lyu et al., "Multiuser Joint Task Offloading and Resource Optimization in Proximate Clouds," IEEE Transactions on Vehicular Technology, Apr. 2017, vol. 66, No. 4, pp. 3435-3447.
Sardellitti et al., "Joint Optimization of Radio and Computational Resources for Multicell Mobile-Edge Computing," IEEE Transactions on Signal and Information Processing Over Networks, Jun. 2015, vol. 1, No. 2, pp. 89-103.
Tan et al., "Mobility-Aware Edge Caching and Computing in Vehicle Networks: A Deep Reinforcement Learning," IEEE Transactions on Vehicular Technology, Nov. 2018, vol. 67, No. 11, pp. 10190-10203.
Tan et al., "Twin-Timescale Artificial Intelligence Aided Mobility-Aware Edge Caching and Computing in Vehicular Networks," IEEE Transactions On Vehicular Technology, Apr. 2019, vol. 68, No. 4, pp. 3086-3099.
Xiohui et al., "Survey of mobile edge computing application in vehicular networks," English Abstract, Application Research of Computers, Jun. 30, 2020, vol. 37, No. 6, doi: 10.19734/j.issn.1001-3695.2019.01.0001, 9 pages.
Yang et al., "Efficient Mobility-Aware Task Offloading for Vehicular Edge Computing Networks," IEEE Access, 2019, vol. 7, pp. 26652-26664.
Zhang et al., "Energy-Optimal Mobile Cloud Computing under Stochastic Wireless Channel," IEEE Transactions on Wireless Communications, Sep. 2013, vol. 12, No. 9, pp. 4569-4581.

* cited by examiner

ENERGY-EFFICIENT OPTIMIZED COMPUTING OFFLOADING METHOD FOR VEHICULAR EDGE COMPUTING NETWORK AND SYSTEM THEREOF

CROSS REFERENCE TO RELATED APPLICATION(S)

This patent application is the U.S. National Phase of PCT International Application No. PCT/CN2020/106730, filed on Aug. 4, 2020, which claims the benefit and priority of Chinese Patent Application filed in China National Intellectual Property Administration on Jul. 15, 2020, having the Application NO. 202010678857.4 and entitled as "Energy-Efficient Optimized Computing Offloading Method For Vehicular Edge Computing Network And System Thereof", the disclosure of both of which are incorporated by reference herein in their entireties as part of the present application.

TECHNICAL FIELD

The present disclosure relates to the field of vehicular edge computing networks, in particular to an energy-efficient optimized computing offloading method for a vehicular edge computing network and a system thereof.

BACKGROUND ART

Vehicular Edge Computing Network (VECN) pushes cloud services to the edge of the vehicular network. The MEC (Mobile Edge Computing) server deployed on the base station (BS) at the edge of the vehicular network provides cloud-based computing and storage services, which can overcome the shortcomings of cloud computing, such as being far away from end users and congestion in the core network. Due to the limited vehicular computing resources, the computation-intensive and latency sensitive computing tasks generated by vehicular applications fails to be executed on local devices, thus, it is difficult to satisfy the computing requirements of the vehicles and passengers. By offloading computation-intensive tasks to the MEC server, vehicles can get faster interactive response and/or save energy-consumption. However, the computation offloading is a very complex process, which is affected by the quality of transmission and backhaul links, user preference, local computing capacity, the capacity and availability of cloud computing, etc. Therefore, to adapt to the QoS of vehicular users, the factors that need to be considered when designing the vehicular computing task offloading scheme include what's the data size to be offloaded, which part of the computing task should be offloaded, how to effectively allocate communication and computing resources for vehicles, and the impact of the vehicle mobility on the communication links.

Without loss of generality, the computing offloading schemes are classified into three types: local computing, full offloading and partial offloading. Compared with full offloading, partial offloading benefits from parallel computing and latency. However, partial offloading is a very complicated process, which is affected by many factors, namely, whether the computing tasks can be partitioned, the data size and required computing capacity of the offloadable and non-offloadable parts are different, which part can be offloaded to the MEC, and some computing tasks coupled with other input data are unavailable for parallel processing. Compared with the partial offloading, local computing and full offloading (collectively referred to the binary offloading strategy, 0 represents local computing and 1 represents full offloading) are more practical, and hence, the binary offloading strategy is investigated in the present disclosure.

In recent years, many scholars have studied the task offloading schemes in MEC network and VECN. To minimize the completion time of computing tasks, in Le H Q, Al-Shatri H, Klein A. Efficient resource allocation in mobile-edge computation offloading: Completion time minimization[C]// In 2017 IEEE International Symposium on Information Theory (ISIT). IEEE, 2017: 2513-2517., a joint optimization problem is modeled for the time division multiple access (TDMA) and frequency division multiple access (FDMA) schemes in a multi-user mobile edge computing offload (MECO) system, however, the computing time of the MEC server is unfortunately ignored, which makes it unsuitable for scenarios where the computing resources of the MEC server are limited. In terms of energy consumption, in Sardellitti S, Scutari G, Barbarossa S. Joint optimization of radio and computational resources for multicell mobile-edge computing[J] In IEEE Transactions on Signal and Information Processing Over Networks, 2015, 1 (2): 89-103., an offloading scheme with minimized energy consumption is developed by optimizing the radio resources in the MIMO multi-cell system, while the scheme neglects the latency optimization issue and is not suitable for the vehicular network with sensitive latency requirements. In order to meet the requirements of different users on energy consumption and latency, in Dinh T Q, Tang J, La Q D, et al. Offloading in mobile edge computing: Task allocation and computational frequency scaling[J]. IEEE Transactions on Communications, 2017, 65(8): 3571-3584. and Guo S, Liu J, Yang Y, et al. Energy-efficient dynamic computation offloading and cooperative task scheduling in mobile cloud computing[J] In IEEE Transactions on Mobile Computing, 2019, 18 (2): 319-333., energy consumption and latency weighting factors are introduced in the design of the offloading strategy. However, these schemes assume that the mobile device remains stationary or moves slowly during the offloading process and the offloading channel is stable, while these assumptions are unpractical for the vehicular network with fast-moving vehicles. Considering the mobility of vehicles and hard latency constraints, in Hu R Q. Mobility-aware edge caching and computing in vehicular networks: A deep reinforcement learning[J]. IEEE Transactions on Vehicular Technology, 2018, 67(11): 10190-10203. and Hu R Q, Hanzo L. Twin-timescale artificial intelligence aided mobility-aware edge caching and computing in vehicular networks[J]. IEEE Transactions on Vehicle Technology, 2019, 68 (4): 3086-3099. and Yang C, Liu Y, Chen X, In et al. Efficient mobility-aware task off-loading for vehicle edge computing networks [J]. IEEE Access, 2019, 7: 26652-26664., a joint allocation scheme of communication and computing resources is proposed, and the transmission rate of uploading computing tasks to the BS is only related to the initial position of the vehicle, and the V2I communication quality is constant during computing offloading. However, in the practical situation, the moving speed of the vehicles will have an effect on the V2I communication quality to a certain extent, thus affecting the offloading decision.

In the process of computing offloading, as the vehicle moves close to the BS, the communication distance of V2I link decreases and the transmission rate of V2I link increases. Therefore, before the offloading decision, as well as the allocating communication and computing resources, the initial position and moving speed of the vehicle and their relationships with the communication rate should be investigated.

SUMMARY

The purpose of the present disclosure is to provide an energy-efficient optimized computing offloading method for a vehicular edge computing network and a system thereof, so as to improve the computing offloading efficiency.

The technical scheme of the present disclosure is as follows:

An energy-efficient optimized computing offloading method for a vehicular edge computing network, comprising:

calculating the energy efficiency cost EEC of local computing;

calculating the energy efficiency cost EEC of mobile edge computing;

determining an optimal offloading decision based on the energy efficiency cost of local computing and the energy efficiency cost of mobile edge computing;

determining an optimal CPU frequency and an optimal transmit power of the vehicle based on the optimal offloading decision; and determining the optimal offloading time of the vehicle based on the optimal CPU frequency and the optimal transmit power of the vehicle.

Preferably, calculating the energy efficiency cost EEC of local computing specifically comprises:

Calculating the local computing latency;

determining the energy consumption of local computing based on the local computing latency; and determining the energy efficiency cost EEC of local computing based on the energy consumption of local computing.

Preferably, calculating the local computing latency specifically adopts the following formula:

$$T_n^l = \frac{L_n C_n}{f_n^l}$$

where $f_n^l$ represents the CPU frequency of the vehicle n, $L_n$ represents the data size of the task $R_n$, and $C_n$ represents the computational complexity of the task $R_n$;

determining the energy consumption of local computing based on the local computing latency specifically adopts the following formula:

$$E_n^l = k T_n^l (f_n^l)^3 = k L_n C_n (f_n^l)^2$$

where k represents effective switching capacitance coefficient, $T_n^l$ represents the local computing latency, $f_n^l$ represents the CPU frequency of the vehicle n, $L_n$ represents the data size of the task $R_n$, and $C_n$ represents the computational complexity of the task $R_n$;

determining the energy efficiency cost EEC of local computing based on the energy consumption and latency of local computing adopts the following formula:

$$Z_n^l = \beta_n^T T_n^l + \beta_n^E E_n^l$$

where $0 \leq \beta_n^T \leq 1$ and $0 \leq \beta_n^E \leq 1$ represent the weight factors of latency and energy consumption, respectively, $T_n^l$ represents the latency of local computing, and $E_n^l$ represents the energy consumption of local computing.

Preferably, calculating the energy efficiency cost EEC of mobile edge computing specifically comprises:

calculating the distance between the vehicle n and the base station BS;

determining the channel gain between the vehicle n and the base station based on the distance;

determining the real-time transmission rate from the vehicle n to the base station based on the channel gain;

determining task offloading time based on the real-time transmission rate;

calculating the computing time of the MEC server;

determining the total latency of mobile edge computing based on the task offloading time and the computing time of the MEC server;

calculating the energy consumption of mobile edge computing; and determining the energy efficiency cost EEC of mobile edge computing based on the energy consumption of mobile edge computing and the total latency of mobile edge computing.

Preferably, calculating the distance between the vehicle n and the base station BS specifically adopts the following formula:

$$d_n(t) = \sqrt{H^2 + D^2 + (x_n + v_n t)^2}$$

where H represents the antenna height of the base station, D represents the vertical distance between the base station and the road, $x_n$ represents the initial position of the vehicle n on the road, and $v_n$ represents the moving speed of the vehicle n;

determining the channel gain between the vehicle n and the base station based on the distance specifically adopts the following formula:

$$G_n(t) = \beta_0 d_n(t)^{-\theta} = \frac{\beta_0}{\left[H^2 + D^2 + (x_n + v_n t)^2\right]^{\frac{\theta}{2}}}$$

where $\beta_0$ represents the gain at the reference distance $d_0 = 1m$, and $\theta$ represents the path loss factor of V2I link;

determining the real-time transmission rate from the vehicle n to the base station based on the channel gain specifically adopts the following formula:

$$r_n(t) = W \log_2\left(1 + \frac{p_n G_n(t)}{\sigma^2}\right)$$

$$= W \log_2\left(1 + \frac{p_n \rho_0}{\left[H^2 + D^2 + (x_n + v_n t)^2\right]^{\frac{\theta}{2}}}\right)$$

where W represents the channel bandwidth, $p_n > 0$ represents the transmit power of the vehicle n, $\rho_0 = \beta_0/\sigma^2$, $\sigma^2$ represents the noise power of the BS receiver, and $G_n(t)$ represents the channel gain between the vehicle n and the base station;

determining task offloading time based on the real-time transmission rate specifically adopts the following formula:

$$\int_0^{t_n^{ot}} r_n(t) dt = L_n$$

where $t_n^{ot}$ represents the task offloading time, $L_n$ represents the data size of the task $R_n$, and $r_n(t)$ represents the real-time transmission rate from the vehicle n to the base station;

calculating the computing time of the MEC server specifically adopts the following formula:

$$t_n^{oe} = \frac{L_n C_n}{f_{MEC}}$$

where $f_{MEC}$ represents the computing capacity of the MEC server;

determining the total latency of mobile edge computing based on the task offloading time and the computing time of the MEC server specifically adopts the following formula:

$$T_n^o = t_n^{ot} + t_n^{oe}$$

where $t_n^{oe}$ represents the computing time of the MEC server, and $t_n^{ot}$ represents the task offloading time;

calculating the energy consumption of mobile edge computing specifically adopts the following formula:

$$E_n^o = p_n t_n^{ot}$$

determining the energy efficiency cost EEC of mobile edge computing based on the energy consumption of mobile edge computing and the total latency of mobile edge computing specifically adopts the following formula:

$$Z_n^o = \beta_n^T T_n^o + \beta_n^E E_n^o$$

where $T_n^o$ represents the total latency of mobile edge computing, $E_n^o$ represents the energy consumption of mobile edge computing, $\beta_n^T$ represents the latency weight factor, and $\beta_n^E$ represents the energy consumption weight factor.

Preferably, determining an optimal offloading decision based on the energy efficiency cost of local computing and the energy efficiency cost of mobile edge computing specifically adopts the following formula:

$$a_n^* = \begin{cases} 1, & \text{if } Cost_n^o < Cost_n^l \ \& T_n^o < c_n \\ 0, & \text{otherwise} \end{cases}$$

where $a_n^*$ represents the optimal offloading decision, $$c_n \triangleq \frac{\sqrt{R_{max}^2 - D^2} - x_n}{v_n}$$

represents the maximum communication time between the vehicle and the BS, $R_{max}$ represents the maximum communication coverage of the base station BS, D represents the vertical distance between the base station and the road, $x_n$ represents the initial position of the vehicle n on the road, $v_n$ represents the moving speed of the vehicle n, $$Cost_n^l \triangleq Z_n^l + \lambda_n \frac{L_n C_n}{f_n^l}$$

represents the computing cost of local computing, $$Cost_n^o \triangleq Z_n^o + \lambda_n \left( t_n^{ot} + \frac{L_n C_n}{f_{MEC}} \right)$$

represents the computing cost of mobile edge computing, $\lambda_n$ represents the Lagrange multiplier corresponding to the latency constraint $(1-a_n)T_n^l + a_n T_n^o \leq T_{n,max}$, $a_n$ represents the decision variable, and $T_{n,max}$ represents the maximum tolerable latency.

Preferably, determining an optimal CPU frequency and an optimal transmit power of the vehicle based on the optimal offloading decision specifically comprises:

when $a_n^* = 0$, determining the optimal CPU frequency of the vehicle by the following formula:

$$f_n^{l*} = \begin{cases} \sqrt[3]{\frac{\beta_n^T + \lambda_n}{2\beta_n^E k}}, & \text{if } 0 \leq \sqrt[3]{\frac{\beta_n^T + \lambda_n}{2\beta_n^E k}} \leq f_{n,max}^l \\ f_{n,max}^l, & \text{otherwise} \end{cases}$$

where $f_{n,max}^l$ represents the maximum CPU frequency of the vehicle n, $f_n^{l*}$ represents the optimal CPU frequency of the vehicle, $\beta_n^T$ represents the latency weight parameter, $\lambda_n$ represents the Lagrange multiplier corresponding to the latency constraint, $\beta_n^E$ represents the energy consumption weight factor, and k represents the effective switched capacitor coefficient, when $a_n^* = 1$, the optimal transmit power of vehicle n is determined by the following formula:

$$p_n^* = \begin{cases} 0, & \text{if } \hat{p}_n < 0 \\ \hat{p}_n, & \text{if } 0 \leq \hat{p}_n \leq p_{n,max} \\ p_{n,max}, & \text{if } \hat{p}_n > p_{n,max} \end{cases}$$

where $p_{n,max}$ represents the maximum transmit power of the vehicle n, $\hat{p}_n$ is the unique solution of the equation $\beta_n^E t_n^{ot} - \chi_n \varphi'(p_n, t_n^{ot}) = 0$, $\chi_n$ represents the Lagrange multiplier corresponding to the constraint $a_n L_n \leq \varphi(p_n, T_n^{ot})$, $\varphi(p_n, t_n^{ot}) \triangleq \int_0^{t_n^{ot}} r_n(\tau) d\tau$, $$\varphi'(p_n, t_n^{ot}) \triangleq \frac{\partial \varphi(p_n, t_n^{ot})}{\partial p_n}.$$

Preferably, determining the optimal offloading time of the vehicle based on the optimal CPU frequency and the optimal transmit power of the vehicle specifically comprises:

determining the cost function; and determining the optimal offloading time of the vehicle using a one-dimensional linear search method base on the cost function.

Preferably, determining the cost function specifically adopts the following formula:

$$\zeta(t_n^{ot}) = \sum_{n=1}^N \left\{ \begin{array}{l} \beta_n^T \left[ (1-a_n^*) \frac{L_n C_n}{f_n^{l*}} + a_n^* \left( t_n^{ot} + \frac{L_n C_n}{f_{MEC}} \right) \right] + \\ \beta_n^E \left[ (1-a_n^*) k L_n C_n (f_n^{l*})^2 + a_n^* p_n^* t_n^{ot} \right] \end{array} \right\};$$

where $L_n$ represents the data size of the task $R_n$, $C_n$ represents the computational complexity of the task $R_n$, $\beta_n^T$ represents the latency weight factor, $\beta_n^E$ represents the energy consumption weight factor, $a_n^*$ represents the optimal offloading decision, $f_n^{l*}$ represents the optimal CPU frequency of the vehicle, $p_n^*$ represents the optimal transmit power of vehicle n, $t_n^{ot}$ represents the task offloading time, and k represents the effective switched capacitor coefficient, determining the optimal offloading time of the vehicle using a one-dimensional linear search method base on the cost function specifically adopts the following formula:

$$\min_{t_n^{ot}} \zeta(t_n^{ot})$$

$$s.t.\ 0 \le t_n^{ot} \le c_n$$

where $C_n$ represents the maximum communication time between the vehicle and the BS, $t_n^{ot}$ represents the task offloading time, and $\zeta(t_n^{ot})$ represents the energy efficiency cost function for the vehicle to complete the calculation task.

The present disclosure further provides an energy-efficient optimized computing offloading system in a vehicular edge computing network, wherein the system comprises:

a module for calculating energy efficiency cost of local computing, which is configured to calculate the energy efficiency cost EEC of local computing;

a module for calculating energy efficiency cost of mobile edge computing, which is configured to calculate the energy efficiency cost EEC of mobile edge computing;

an optimal offloading decision determining module, which is configured to determine an optimal offloading decision based on the energy efficiency cost of local computing and the energy efficiency cost of mobile edge computing;

an optimal CPU frequency and optimal transmit power determining module, which is configured to determine an optimal CPU frequency and an optimal transmit power of the vehicle based on the optimal offloading decision; and an optimal offloading time determining module, which is configured to determine the optimal offloading time of the vehicle based on the optimal CPU frequency and the optimal transmit power of the vehicle.

Compared with the prior art, the present disclosure has the following advantages.

The present disclosure relates to an energy-efficient optimized computing offloading method for a vehicular edge computing network. The method comprises: calculating the energy efficiency cost EEC of local computing; calculating the energy efficiency cost EEC of mobile edge computing; determining an optimal offloading decision based on the energy efficiency cost of local computing and the energy efficiency cost of mobile edge computing; determining an optimal CPU frequency and an optimal transmit power of the vehicle based on the optimal offloading decision; and determining the optimal offloading time of the vehicle based on the optimal CPU frequency and the optimal transmit power of the vehicle, thereby greatly improving the computing offloading efficiency.

BRIEF DESCRIPTION OF THE DRAWINGS

The present disclosure will be further explained with reference to the accompanying drawings.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The embodiments of the present disclosure have been described in detail with reference to the attached drawings, but the present disclosure is not limited to the above embodiments. Various changes can be made within the knowledge of those skilled in the art without departing from the purpose of the present disclosure.

The purpose of the present disclosure is to provide an energy-efficient optimized computing offloading method for a vehicular edge computing network and a system thereof, so as to improve the computing offloading efficiency.

In order to make the above objects, features and advantages of the present disclosure more obvious and understandable, the present disclosure will be further explained in detail hereinafter with reference to the drawings and specific embodiments.

Figure 1:
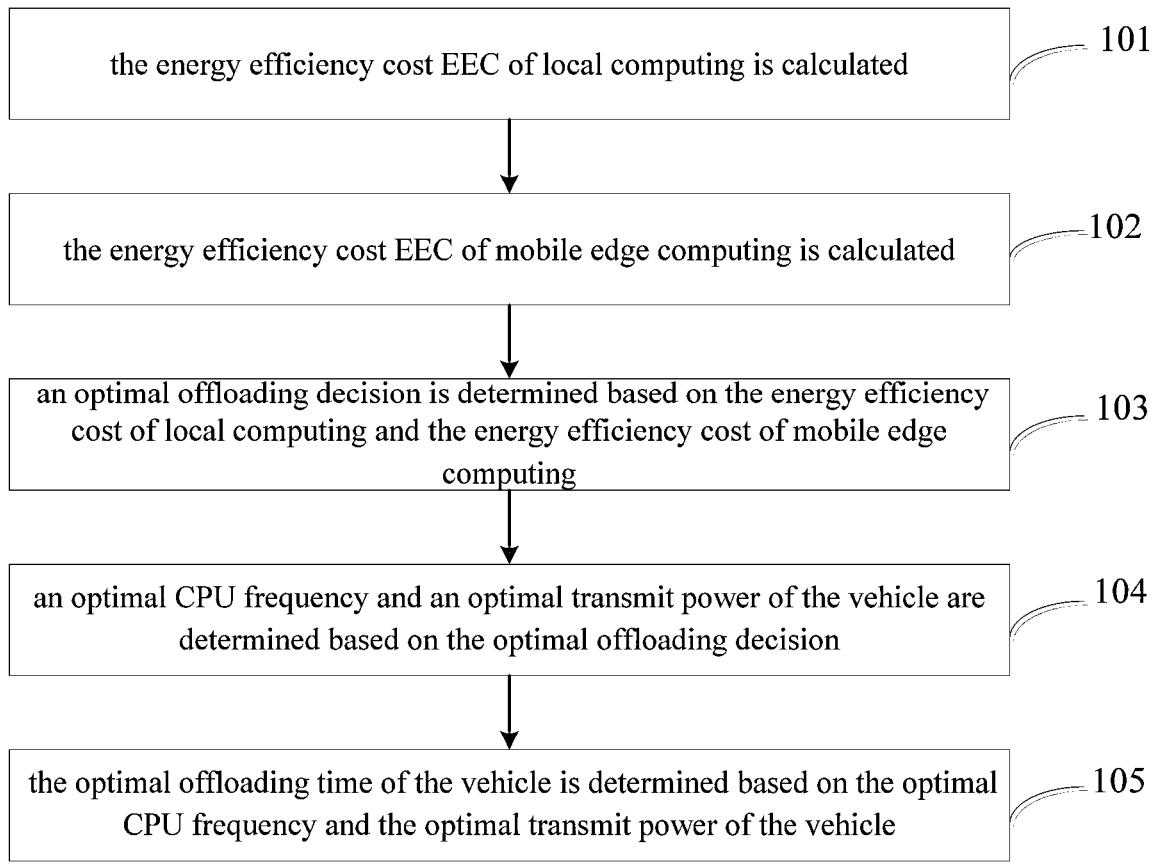
FIG. 1 is a flowchart of an energy-efficient optimized computing offloading method for a vehicular edge computing network according to an embodiment of the present disclosure.

FIG. 1 is a flowchart of an energy-efficient optimized computing offloading method for a vehicular edge computing network according to an embodiment of the present disclosure. As shown in FIG. 1, the method comprises the following steps.

Figure 3:
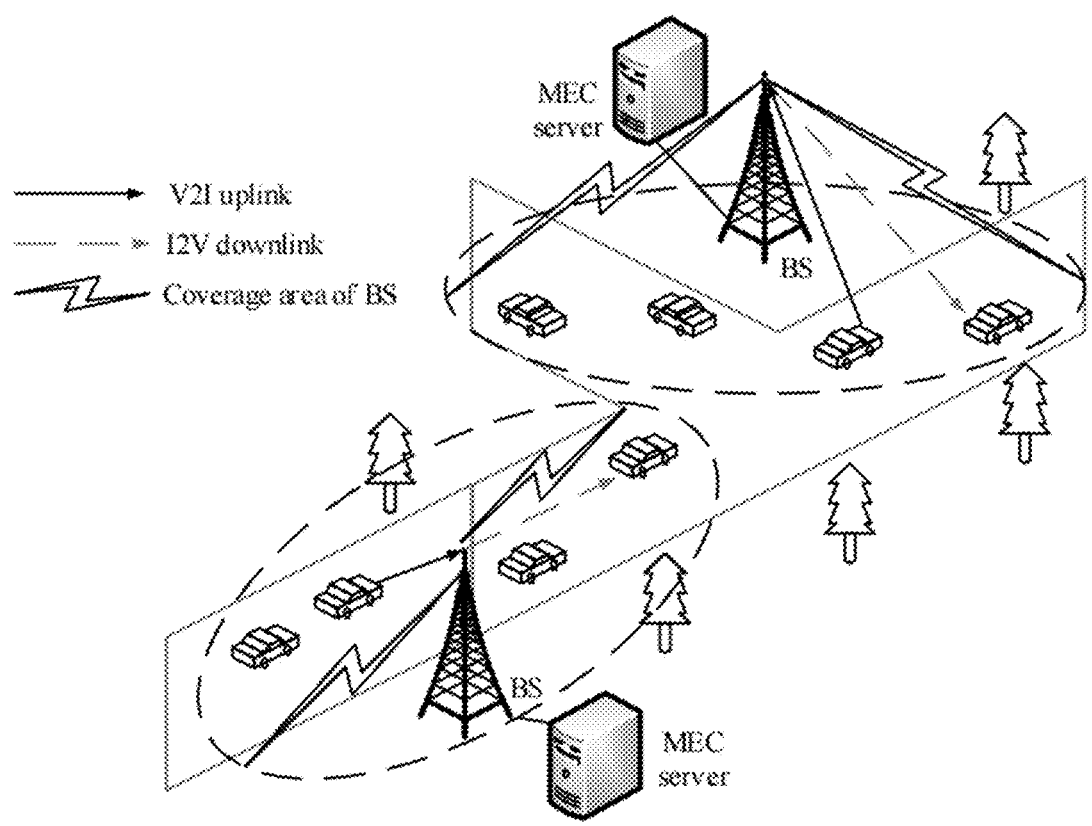
FIG. 3 is a schematic diagram of a system model of a vehicular edge computing network according to an embodiment of the present disclosure.
Figure 4:
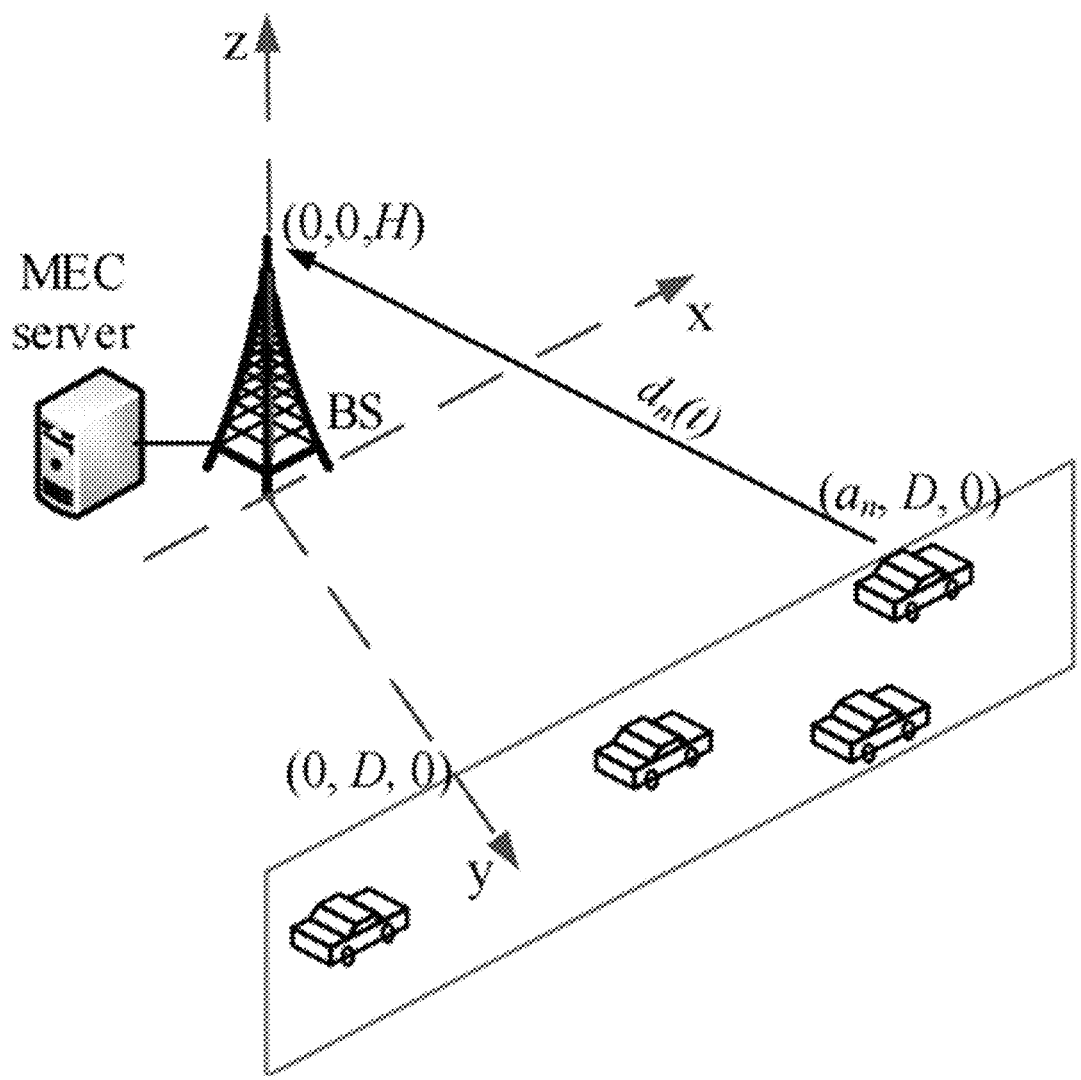
FIG. 4 is a schematic diagram of a vehicular edge computing framework according to an embodiment of the present disclosure.

A group of vehicles is set in a VECN, which is denoted as N={1, 2, . . . , n}, in which each vehicle has a computation-intensive or latency sensitive task to be completed. The task is denoted as $R_n=(L_n, C_n, T_{n,max})$, in which $L_n$ represents the data size of the task $R_n$; $C_n$ represents the computational complexity of the task $R_n$; $T_{n,max}$ represents the maximum tolerable latency of the task $R_n$. The system model of the vehicular edge computing network is shown in FIG. 3, and the edge computing framework is shown in FIG. 4.

Step 101: the energy efficiency cost EEC of local computing is calculated.

Step 102: the energy efficiency cost EEC of mobile edge computing is calculated.

Step 103: an optimal offloading decision is determined based on the energy efficiency cost of local computing and the energy efficiency cost of mobile edge computing.

Step 104: an optimal CPU frequency and an optimal transmit power of the vehicle are determined based on the optimal offloading decision.

Step 105: the optimal offloading time of the vehicle is determined based on the optimal CPU frequency and the optimal transmit power of the vehicle.

Specifically, in step 101, calculating the energy efficiency cost EEC of local computing specifically comprises the following steps.

Step 1011: the local computing latency is calculated.
The specific formula is as follows:

$$T_n^l = \frac{L_n C_n}{f_n^l}$$

where $f_n^l$ represents the CPU frequency of the vehicle n, $L_n$ represents the data size of the task $R_n$, and $C_n$ represents the computational complexity of the task $R_n$.

Step 1012: the energy consumption of local computing is determined based on the local computing latency.
The specific formula is as follows:

$$E_n^l = kT_n^l(f_n^l)^3 = kL_n C_n (f_n^l)^2$$

where k represents effective switching capacitance coefficient, $T_n^l$ represents the local computing latency, $f_n^l$ represents the CPU frequency of the vehicle n, $L_n$ represents the data size of the task $R_n$, and $C_n$ represents the computational complexity of the task $R_n$.

Step 1013: the energy efficiency cost EEC of local computing is determined based on the energy consumption of local computing.
The specific formula is as follows:

$$Z_n^l = \beta_n^T T_n^l + \beta_n^E E_n^l$$

where $0 \leq \beta_n^T \leq 1$ and $0 \leq \beta_n^E \leq 1$ represent the weight factors of latency and energy consumption, respectively, $T_n^l$ represents the latency of local computing, and $E_n^l$ represents the energy consumption of local computing.

Specifically, in step 102, calculating the energy efficiency cost EEC of mobile edge computing specifically comprises the following steps.

Step 1021: the distance between the vehicle n and the base station BS is calculated.
The specific formula is as follows:

$$d_n(t) = \sqrt{H^2 + D^2 + (x_n + v_n t)^2}$$

where H represents the antenna height of the base station, D represents the vertical distance between the base station and the road, $x_n$ represents the initial position of the vehicle n on the road, and $v_n$ represents the moving speed of the vehicle n.

Step 1022: the channel gain between the vehicle n and the base station is determined based on the distance.
The specific formula is as follows:

$$G_n(t) = \beta_0 d_n(t)^{-\theta} = \frac{\beta_0}{[H^2 + D^2 + (x_n + v_n t)^2]^{\frac{\theta}{2}}}$$

where $\beta_0$ represents the gain at the reference distance $d_0 = 1$ m, and $\theta$ represents the path loss factor of V2I link.

Step 1023: the real-time transmission rate from the vehicle n to the base station is determined based on the channel gain.
The specific formula is as follows:

$$r_n(t) = W\log_2\left(1 + \frac{p_n G_n(t)}{\sigma^2}\right)$$
$$= W\log_2\left(1 + \frac{p_n \rho_0}{[H^2 + D^2 + (x_n + v_n t)^2]^{\frac{\theta}{2}}}\right)$$

where W represents the channel bandwidth, $p_n > 0$ represents the transmit power of the vehicle n, $\rho_0 = \beta_0/\sigma^2$, $\sigma^2$ represents the noise power of the BS receiver, and $G_n(t)$ represents the channel gain between the vehicle n and the base station.

Step 1024: task offloading time is determined based on the real-time transmission rate.
The specific formula is as follows:

$$\int_0^{t_n^{ot}} r_n(t) dt = L_n$$

where $t_n^{ot}$ represents the task offloading time, $L_n$ represents the data size of the task $R_n$, and $r_n(t)$ represents the real-time transmission rate from the vehicle n to the base station.

Step 1025: the computing time of the MEC server is calculated.
The specific formula is as follows:

$$t_n^{oe} = \frac{L_n C_n}{f_{MEC}}$$

where $f_{MEC}$ represents the computing capacity of the MEC server.

Step 1026: the total latency of mobile edge computing is determined based on the task offloading time and the computing time of the MEC server.
The specific formula is as follows:

$$T_n^o = t_n^{ot} + t_n^{oe}$$

where $t_n^{oe}$ represents the computing time of the MEC server, and $t_n^{ot}$ represents the task offloading time;

Step 1027: the energy consumption of mobile edge computing is calculated.
The specific formula is as follows:

$$E_n^o = p_n t_n^{ot}$$

Step 1028: the energy efficiency cost EEC of mobile edge computing is determined based on the energy consumption of mobile edge computing and the total latency of mobile edge computing.
The specific formula is as follows:

$$Z_n^o = \beta_n^T T_n^o + \beta_n^E E_n^o$$

where $T_n^o$ represents the total latency of mobile edge computing, $E_n^o$ represents the energy consumption of mobile edge computing, $\beta_n^T$ represents the latency weight factor, and $\beta_n^E$ represents the energy consumption weight factor.

Specifically, in step 103, determining an optimal offloading decision based on the energy efficiency cost of local computing and the energy efficiency cost of mobile edge computing specifically adopts the following formula:

$$a_n^* = \begin{cases} 1, & \text{if } \text{Cost}_n^o < \text{Cost}_n^l \ \& \ T_n^o < c_n \\ 0, & \text{otherwise} \end{cases}$$

where $a_n^*$ represents the optimal offloading decision, $$c_n \triangleq \frac{\sqrt{R_{max}^2 - D^2} - x_n}{v_n}$$

represents the maximum communication time between the vehicle and the BS, $R_{max}$ represents the maximum communication coverage of the base station BS, D represents the vertical distance between the base station and the road, $x_n$ represents the initial position of the vehicle n on the road, $v_n$ represents the moving speed of the vehicle n, $$\text{Cost}_n^l \triangleq Z_n^l + \lambda_n \frac{L_n C_n}{f_n^l}$$

represents the computing cost of local computing, $$\text{Cost}_n^o \triangleq Z_n^o + \lambda_n \left( t_n^{ot} \frac{L_n C_n}{f_{MEC}} \right)$$

represents the computing cost of mobile edge computing, $\lambda_n$ represents the Lagrange multiplier corresponding to the latency constraint $(1-a_n)T_n^l + a_n T_n^o \leq T_{n,max}$, $a_n$ represents the decision variable, and $T_{n,max}$ represents the maximum tolerable latency.

Specifically, in step 104, determining an optimal CPU frequency and an optimal transmit power of the vehicle based on the optimal offloading decision specifically comprises:

when $a_n^*=0$, determining the optimal CPU frequency of the vehicle by the following formula:

$$f_n^{l*} = \begin{cases} \sqrt[3]{\frac{\beta_n^T + \lambda_n}{2\beta_n^E k}}, & \text{if } 0 \leq \sqrt[3]{\frac{\beta_n^T + \lambda_n}{2\beta_n^E k}} \leq f_{n,max}^l \\ f_{n,max}^l, & \text{otherwise} \end{cases}$$

where $f_{n,max}^l$ represents the maximum CPU frequency of the vehicle n, $f_n^{l*}$ represents the optimal CPU frequency of the vehicle, $\beta_n^T$ represents the latency weight parameter, $\lambda_n$ represents the Lagrange multiplier corresponding to the latency constraint, $\beta_n^E$ represents the energy consumption weight factor, and k represents the effective switched capacitor coefficient, when $a_n^*=1$, the optimal transmit power of vehicle n is determined by the following formula:

$$p_n^* = \begin{cases} 0, & \text{if } \hat{p}_n < 0 \\ \hat{p}_n, & \text{if } 0 \leq \hat{p}_n \leq p_{n,max} \\ p_{n,max}, & \text{if } \hat{p}_n > p_{n,max} \end{cases}$$

where $p_{n,max}$ represents the maximum transmit power of the vehicle n, $\hat{p}_n$ is the unique solution of the equation $\beta_n^E t_n^{ot} - \chi_n \varphi'(p_n, t_n^{ot}) = 0$, $\chi_n$ represents the Lagrange multiplier corresponding to the constraint $a_n L_n \leq \varphi(p_n, T_n^{ot})$, $\varphi(p_n, t_n^{ot}) \triangleq \int_0^{t_n^{ot}} r_n(\tau) d\tau$, $$\varphi'(p_n, t_n^{ot}) \triangleq \frac{\partial \varphi(p_n, t_n^{ot})}{\partial p_n}.$$

Specifically, in step 105, determining the optimal offloading time of the vehicle based on the optimal CPU frequency and the optimal transmit power of the vehicle specifically comprises the following steps.

Step 1051: the cost function is determined.
The specific formula is as follows:

$$\zeta(t_n^{ot}) = \sum_{n=1}^{N} \left\{ \begin{array}{l} \beta_n^T \left[ (1-a_n^*) \frac{L_n C_n}{f_n^{l*}} + a_n^* \left( t_n^{ot} + \frac{L_n C_n}{f_{MEC}} \right) \right] + \\ \beta_n^E \left[ (1-a_n^*) k L_n C_n (f_n^{l*})^2 + a_n^* p_n^* t_n^{ot} \right] \end{array} \right\}$$

where $L_n$ represents the data size of the task $R_n$, $C_n$ represents the computational complexity of the task $R_n$, $\beta_n^T$ represents the latency weight factor, $\beta_n^E$ represents the energy consumption weight factor, $a_n^*$ represents the optimal offloading decision, $f_n^{l*}$ represents the optimal CPU frequency of the vehicle, $p_n^*$ represents the optimal transmit power of vehicle n, $t_n^{ot}$ represents the task offloading time, and k represents the effective switched capacitor coefficient.

Step 1052: the optimal offloading time of the vehicle is determined using a one-dimensional linear search method base on the cost function.
The specific formula is as follows:

$$\min_{t_n^{ot}} \zeta(t_n^{ot})$$
$$\text{s.t.} \ 0 \leq t_n^{ot} \leq c_n$$

where $c_n$ represents the maximum communication time between the vehicle and the BS, $t_n^{ot}$ represents the task offloading time, and $\zeta(t_n^{ot})$ represents the energy efficiency cost function for the vehicle to complete the calculation task.

Figure 2:
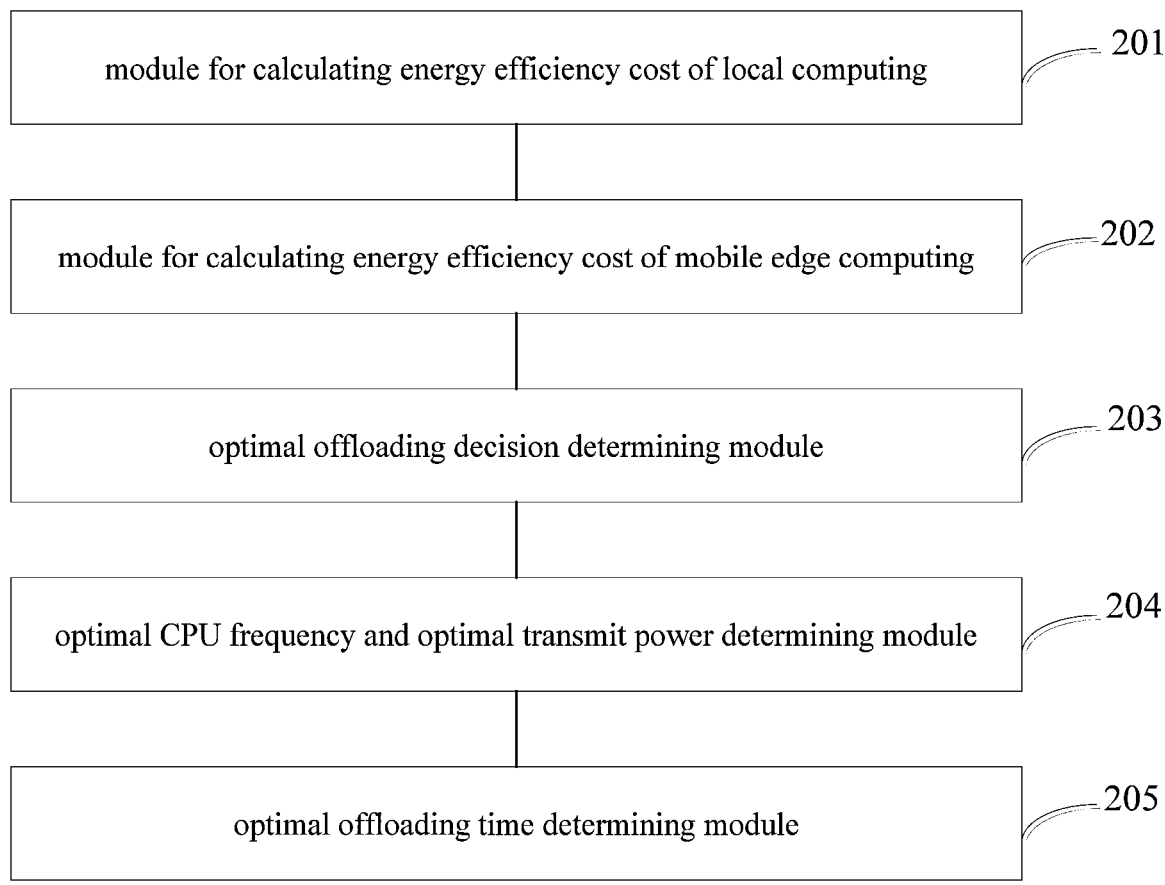
FIG. 2 is a schematic structural diagram of an energy-efficient optimized computing offloading system in a vehicular edge computing network according to an embodiment of the present disclosure.

FIG. 2 is a schematic structural diagram of an energy-efficient optimized computing offloading system in a vehicular edge computing network according to an embodiment of the present disclosure. As shown in FIG. 2, the system comprises:

a module for calculating energy efficiency cost of local computing 201, which is configured to calculate the energy efficiency cost EEC of local computing;

a module for calculating energy efficiency cost of mobile edge computing 202, which is configured to calculate the energy efficiency cost EEC of mobile edge computing;

an optimal offloading decision determining module 203, which is configured to determine an optimal offloading decision based on the energy efficiency cost of local computing and the energy efficiency cost of mobile edge computing;

an optimal CPU frequency and optimal transmit power determining module 204, which is configured to determine an optimal CPU frequency and an optimal transmit power of the vehicle based on the optimal offloading decision; and an optimal offloading time determining module 205, which is configured to determine the optimal offloading time of the vehicle based on the optimal CPU frequency and the optimal transmit power of the vehicle.

In the present disclosure, the performance of the proposed energy-efficient optimized computing offloading strategy is verified by MATLAB software simulation.

TABLE 1

Simulation parameter setting

| Parameter | meaning of parameters | parameter value | |
|---|---|---|---|
| N | Number of vehicles | 10 | |
| H | antenna height | 25 | m |
| D | Distance between the BS and the road | 35 | m |
| $X_n$ | Initial position of the vehicle on the road | (100, 400) | m |
| θ | Path loss exponent | 4 | |
| $β_0$ | Channel gain at the reference distance | −30 | dB |
| W | bandwidth | 5 | MHz |
| $σ^2$ | Noise power | −104 | dBm |
| $p_{max}$ | maximum transmit power of the vehicle | 23 | dBm |
| $v_n$ | moving speed of the vehicle | 100 | Km/h |
| $R_{max}$ | maximum communication coverage of the BS | 500 | m |
| $L_n$ | amount of data of the task | 1 | MB |
| $C_n$ | complexity of the task | (200, 1200) cycles/bit | |
| $f_{max}^l$ | maximum computing capacity of the vehicle | 10 | GHz |
| $f^o$ | computing capacity of the MEC | 50 | GHz |
| $β_n^T$ | Time delay weight | 0.5 | |
| $β_n^E$ | Energy consumption weight | 0.5 | |

Emulation parameters [3] Liang 1, Li g y and Xu w. resource allocation for d2d-enabled vehicle communications [j]. IEEE transactions on communications, 2017, 65 (7), pp. 3186-3197. [4] Lyu X, Tian H, Sengul C. and Zhang P, Eta. Multiuser Joint Task Off Loading And Resource Optimization In Proximate Clouds [j]. IEEE Transactions On Vehicle Technology, 2018, 66 (4): 3435-3447 are set as shown in table 1. The influence of system parameters on the performance of the scheme is first analyzed, and then the performance of the scheme of the present disclosure is compared with that of the following four reference schemes. For the sake of fairness, in the reference scheme, it is assumed that vehicles are always at the midpoint of the maximum communication coverage between the vehicle starting point and the BS, and each vehicle has only one computing task.

LE with fixed CPU frequency: it is of the local computing and the CPU frequency is fixed at $f_n^l = 0.7 f_{max}^l$.

LE with DFVS: it is of the local computing and the CPU frequency can be adjusted according to DFVS technology. The optimal CPU frequency is shown in formula (23).

BO with transmit power control: the binary system is offloaded and the transmit power can be controlled. The optimal transmit power is shown in formula (21), but the local CPU frequency is fixed at $f_n^l = 0.7 f_{max}^l$.

SDR-based scheme [5] Dinh T Q, Tang J, La Q D, et al. Offloading In Mobile Edge Computing: Task Allocation And Computational Frequency Scaling[J]. IEEE Transactions on Communications, 2017, 65(8): 3571-3584.: the binary system is offloaded, and the local CPU frequency can be adjusted according to DFVS technology, as shown in formula (23). The transmit power is fixed at $p_n = p_{max}$.

Figure 5:
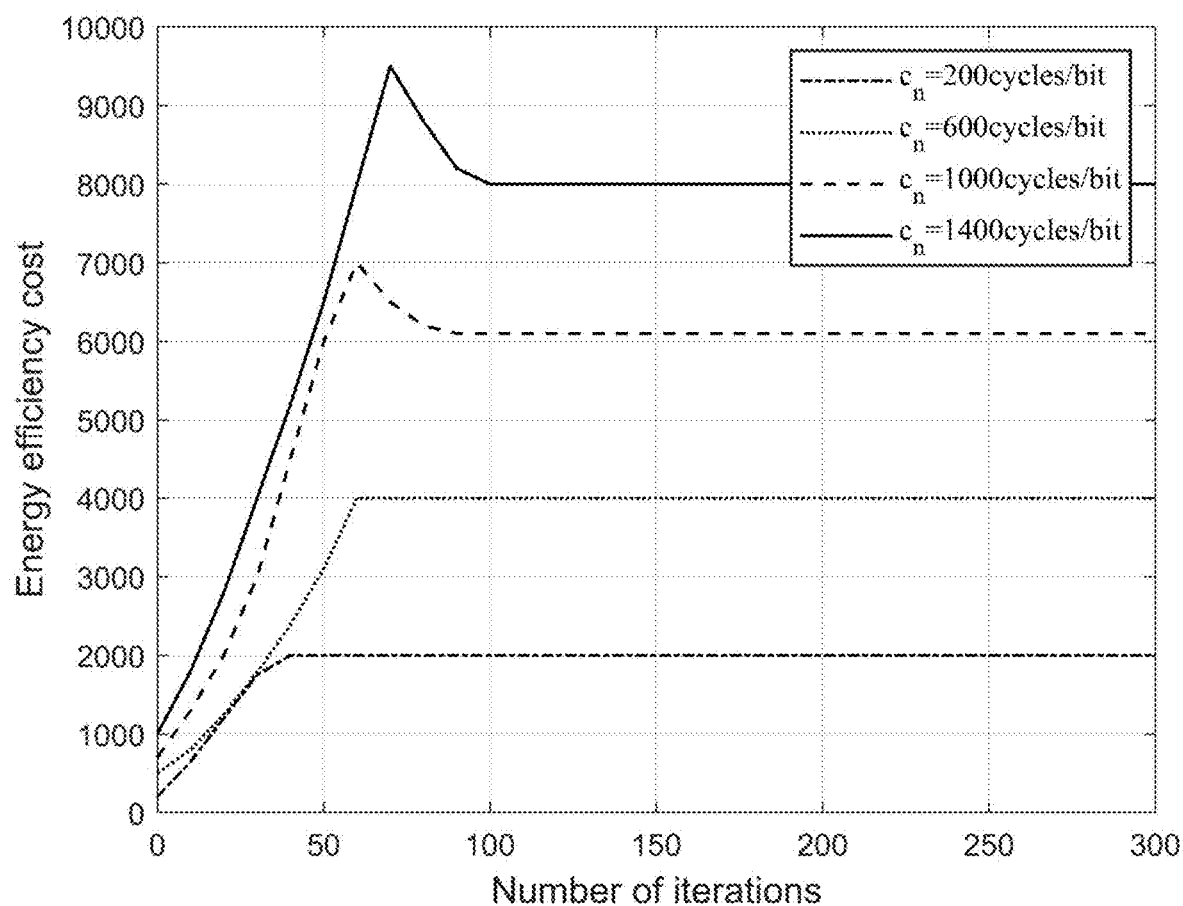
FIG. 5 is a schematic diagram of an algorithm convergence curve according to an embodiment of the present disclosure.

In order to analyze the convergence of the offloading decision and resource allocation algorithm, FIG. 5 shows how the EEC of the proposed algorithm changes with the number of iterations when the task complexity is 200, 600, 1000 and 1400 cycles/bit respectively. It can be observed that (i) the proposed algorithm takes about 40-100 iterations to converge, and each iteration takes 0.2-0.5 ms. Therefore, for the most complex tasks, the algorithm can get the optimal offloading decision and resource allocation in 50 ms at most. (ii) The higher the computational complexity of the task, the slower the convergence speed, that is, the complexity of the task will increase the convergence time. (iii) The greater the computational complexity of the task, the more energy efficiency cost it consumes, which means that the increase of the computational complexity will reduce the efficiency of the task completion.

Figure 6:
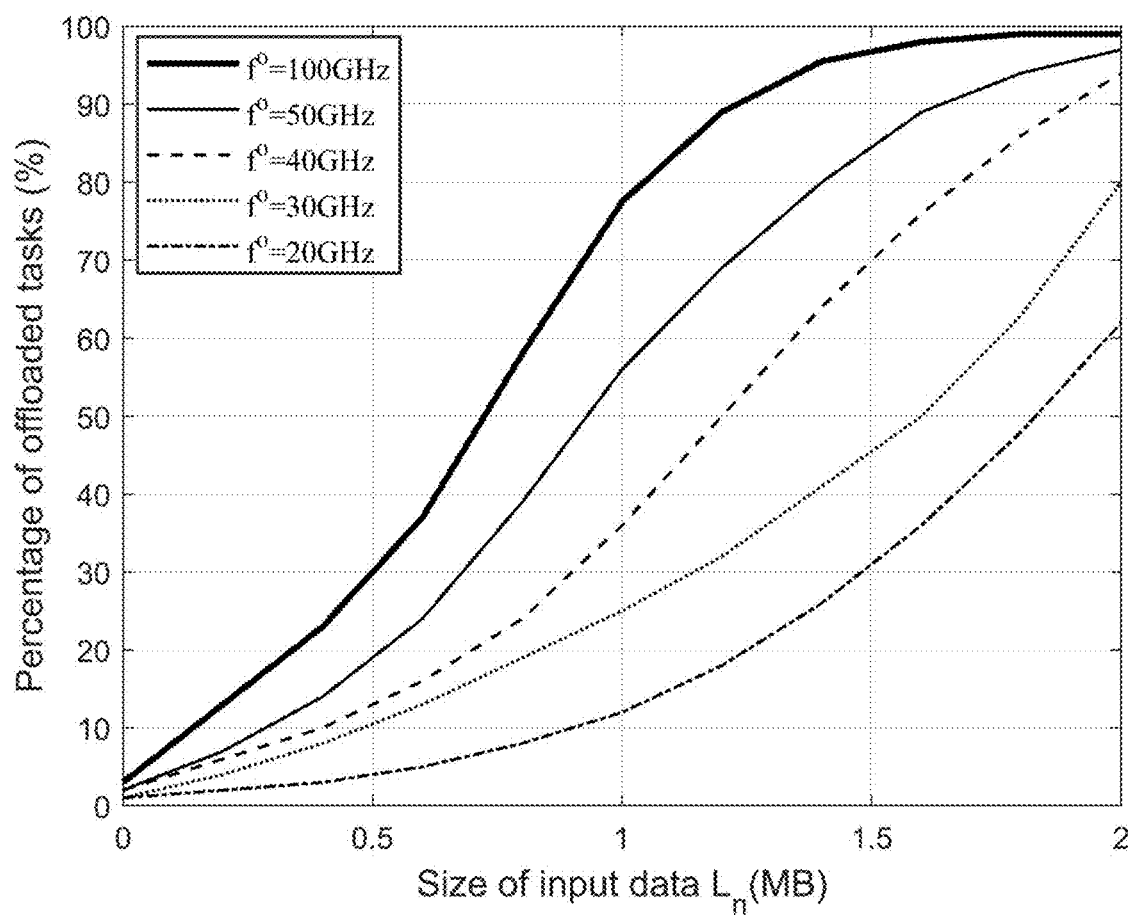
FIG. 6 is a schematic diagram of the proportion of offloading tasks corresponding to different task data sizes according to an embodiment of the present disclosure.

FIG. 6 shows the percentage of offloading tasks under different task data sizes when the CPU computing capacity of the MEC server is 20 GHz, 30 GHz, 40 GHz, 50 GHz and 100 GHz respectively. As can be seen from FIG. 4, with the increasing amount of the task data, the percentage of offloading tasks also increases. This is because, with the increasing amount of the task data, the EEC for executing calculation tasks in the MEC is gradually smaller than that for local computing, so that more and more vehicles choose to offload tasks. At the same time, the curve in FIG. 6 shows that the computing capacity of the MEC server will also affect the task offloading decision, especially when the computing capacity of the MEC server is limited.

Figure 7:
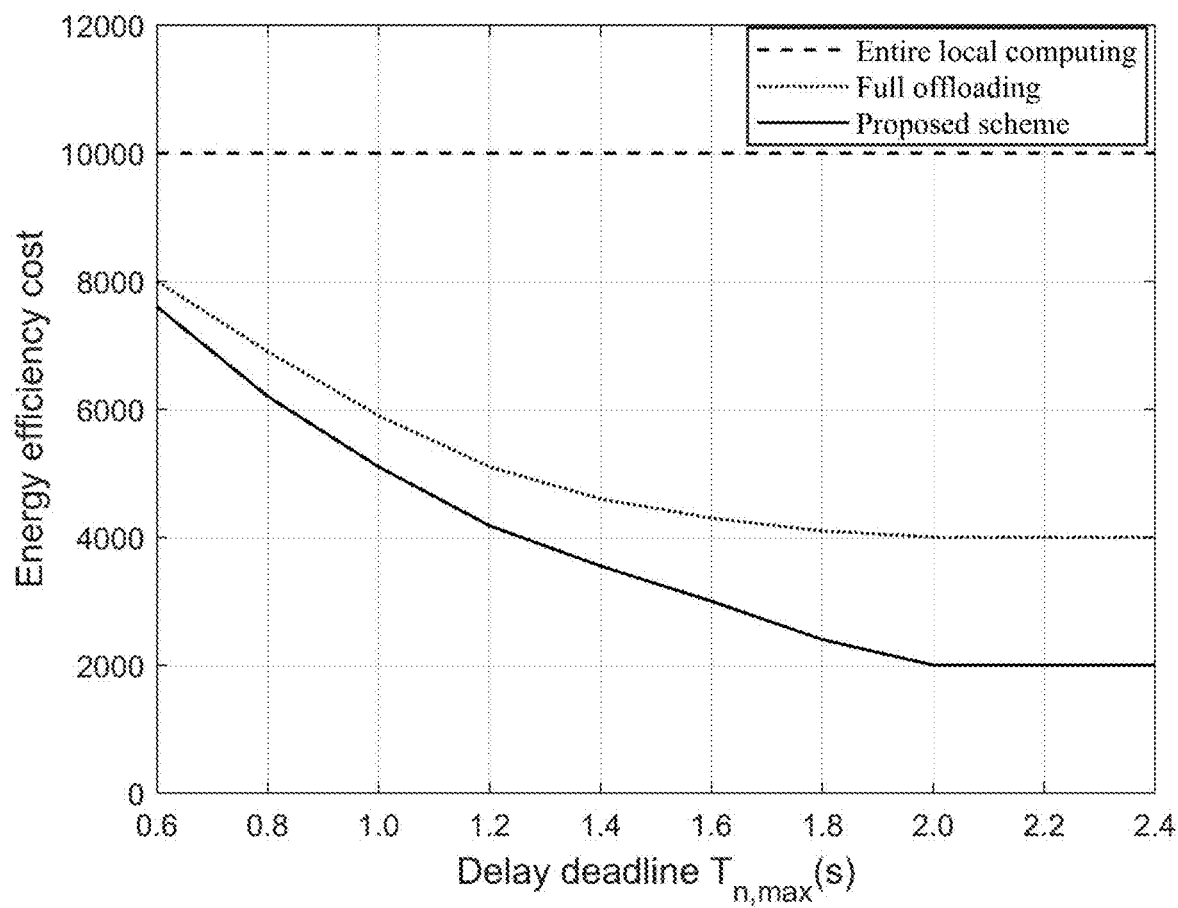
FIG. 7 is a schematic diagram of EEC corresponding to different maximum tolerable latencies according to an embodiment of the present disclosure.

FIG. 7 shows the impact of maximum tolerable latency on the EEC of the scheme in the present disclosure, local computing and full offloading scheme [6] Zhang W, Wen Y, Guan K, et al. Energy-Optimal Mobile Cloud Computing Under Stochastic Wireless Channel [j]. IEEE Transactions on Wireless Communications, 2013, 12 (9): 4569-4581. Comparing the curves in FIG. 7, the following conclusions can be drawn: first, only the task data size, the task complexity and the CPU computing capacity of the vehicle will affect the EEC of the local computing scheme, and the change of the task completion time constraint will not affect the EEC of the local computing. Second, compared with local computing, the proposed scheme can significantly reduce EEC. This is because the scheme proposed by the present disclosure can offload the computation-intensive tasks to the MEC server for execution according to the MEC and the EEC required by the local vehicles to complete the tasks. In addition, compared with the full offloading scheme, the scheme in the present disclosure has lower EEC when the latency constraint is loose, because the scheme proposed by the present disclosure adopts the optimal offloading decision and resource allocation scheme. Finally, when $T_n^{max} > c_n$, the EEC of the full offloading scheme and the scheme in the present disclosure remains unchanged, and the task uploading time is $c_n$, because the vehicle must offload the task to MEC before the V2I link is disconnected.

Figure 8:
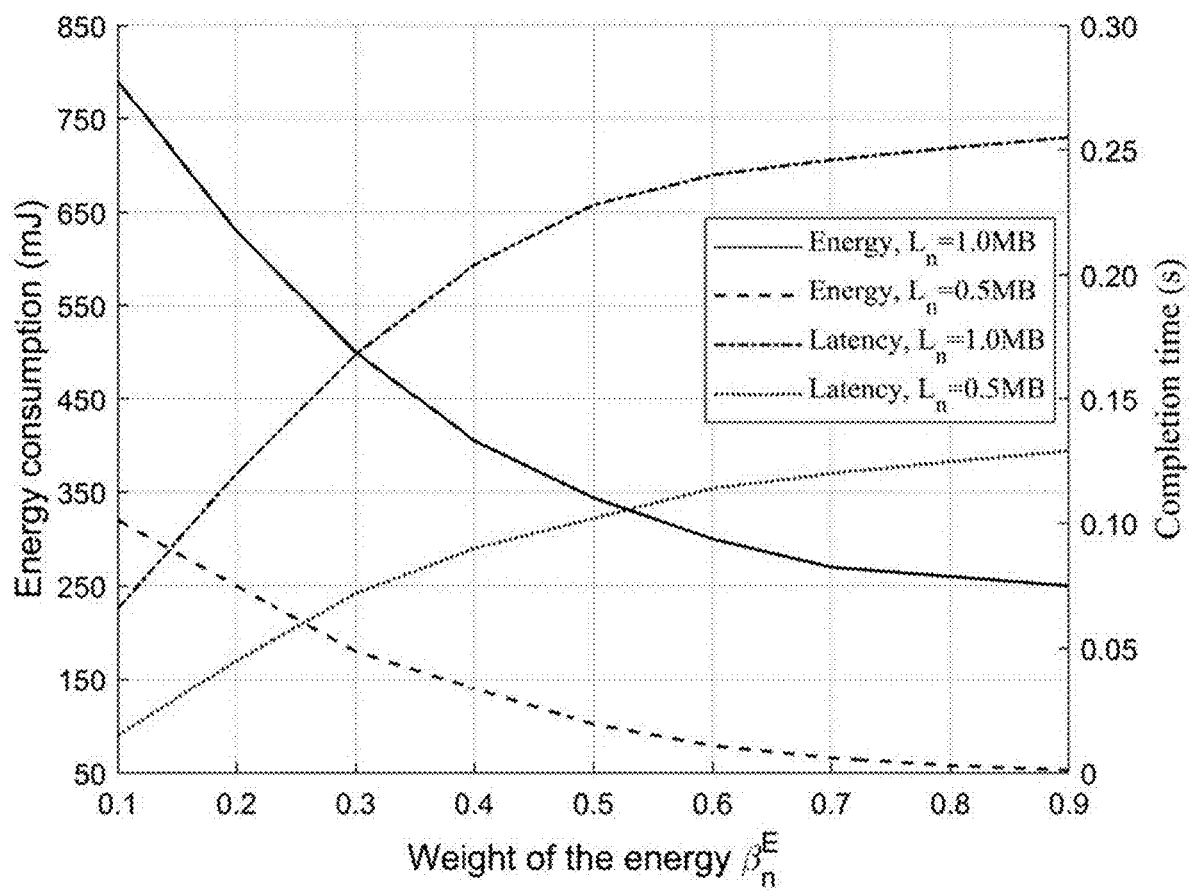
FIG. 8 is a schematic diagram of energy consumption and latency performance of this scheme under the settings of different weight factors $b_n^E$ according to an embodiment of the present disclosure.

FIG. 8 shows the influence on system energy consumption and latency when the energy consumption weight factor $b_n^E$ increases from 0.1 to 0.9 and the latency weight factor $b_n^T = 1 - b_n^E$ decreases from 0.9 to 0.1. It can be found that the system energy consumption decreases with the increase of $b_n^E$ at the cost of increasing the latency, that is, the lower the energy consumption, the greater the latency, which is the trade-off between energy consumption and latency. In addition, tasks with $L_n=0.5$ MB data consume energy resource less than $L_n=1.0$ MB.

Figure 9:
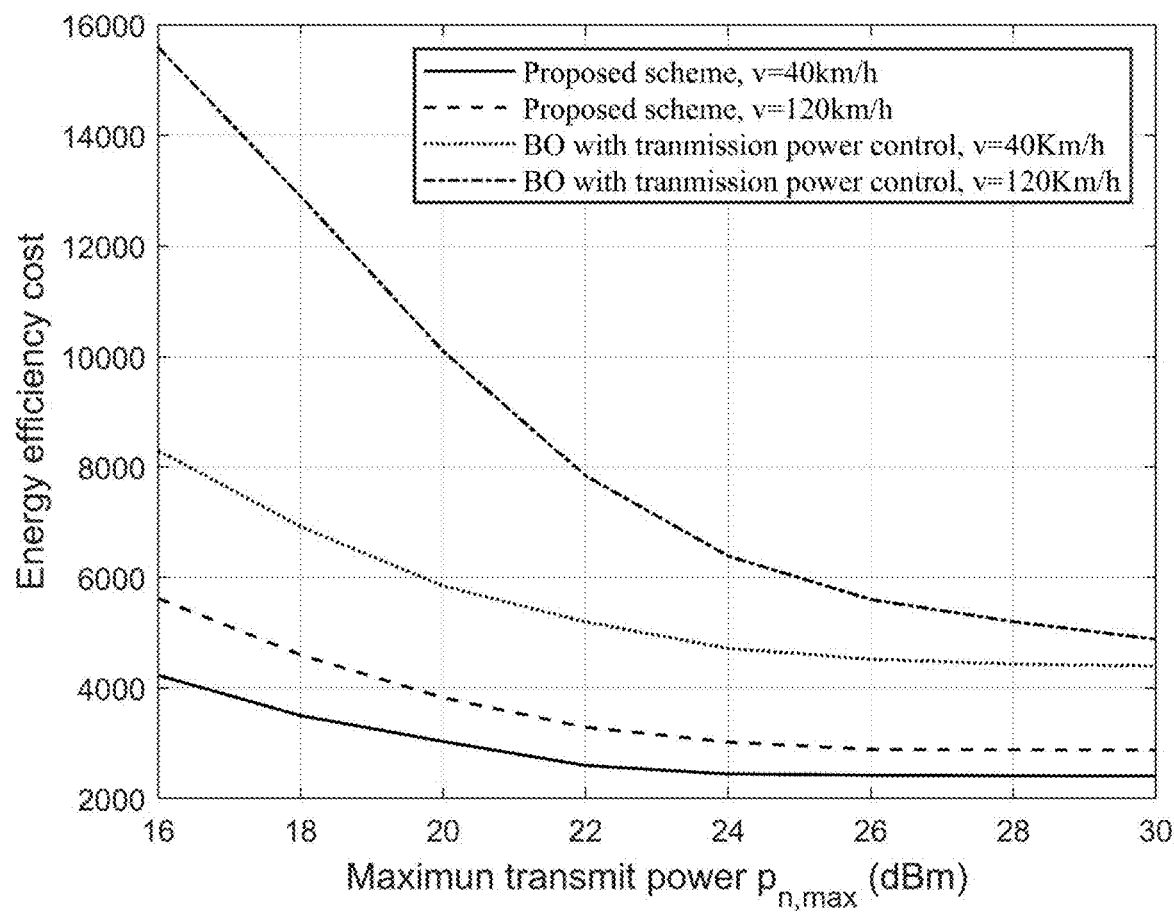
FIG. 9 is a schematic diagram of EEC corresponding to different maximum transmit powers according to an embodiment of the present disclosure.

FIG. 9 shows the influence of the maximum transmit power on the performance of two schemes, namely the scheme proposed by the present disclosure and the binary offloading scheme (the transmit power is controllable and the local CPU frequency is fixed). It can be observed from FIG. 9 that the EEC of the system decreases with the increase of the maximum transmit power $P_{max}$. In addition, when the maximum transmit power $P_{max}$ reaches the threshold, the scheme in the present disclosure reaches EEC saturation because: 1) the increase of the maximum transmit power makes more vehicles offload their computing tasks to the MEC server; 2) with the increase of transmit power, the EEC of the MEC executing tasks gradually approaches the EEC of local computing, so that the number (proportion) of offloading tasks remains stable. Therefore, the EEC of the system will not decrease with the further increase of $P_{max}$. In addition, the figure shows that the higher the vehicle speed, the greater the required EEC.

Figure 10:
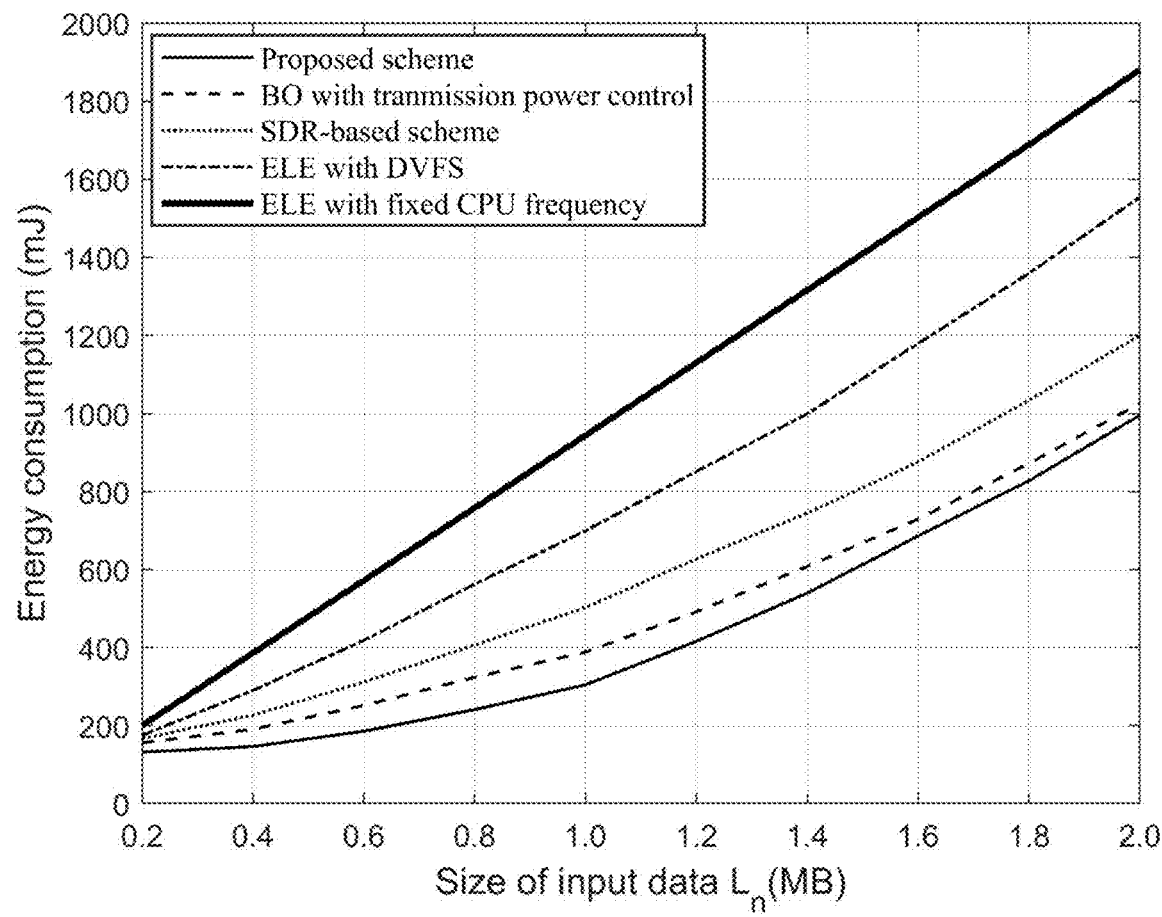
FIG. 10 is a schematic diagram of energy consumption comparison of different schemes according to the embodiment of the present disclosure.
Figure 11:
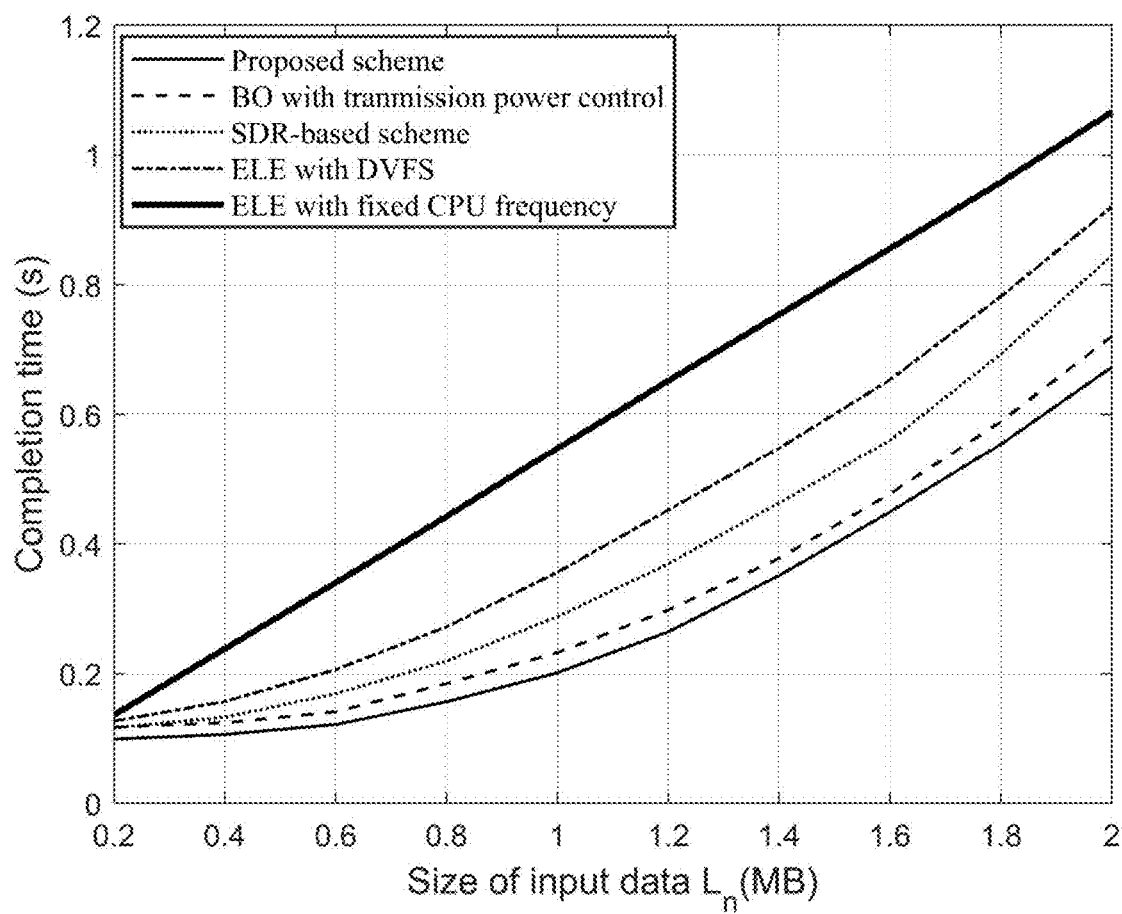
FIG. 11 is a schematic diagram of latency comparison of different schemes according to an embodiment of the present disclosure.

For different task data amounts, the present disclosure compares the energy consumption and task completion time of each scheme in FIG. 10 and FIG. 11. It can be seen from FIG. 10 and FIG. 11 that the energy consumption and the latency of each scheme increase with the increase of the task data, and the performance of the scheme proposed by the present disclosure is better than that of the other four schemes, because the advantages of DVFS technology and transmit power control are fully utilized by the present disclosure. On the one hand, the curves of two local computing schemes are compared, and the curves of the BO scheme with fixed local CPU frequency and the scheme of the present disclosure are compared, which shows the advantages of the DVFS. On the other hand, the scheme of the present disclosure is superior to the scheme based on SDR, which verifies the advantages of transmit power control.

In this specification, each embodiment is described in a progressive manner, and each embodiment focuses on the differences from other embodiments. It is sufficient to refer to the same and similar parts among each embodiment. Because the system disclosed in the embodiment corresponds to the method disclosed in the embodiment, it is described relatively simply, and the relevant points can be found in the description of the method.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. An energy-efficient optimized computing offloading method for a vehicular edge computing network, comprising:
   calculating an energy efficiency cost EEC of local computing, wherein the calculating comprises:
     calculating a local computing latency;
     determining an energy consumption of local computing based on the local computing latency; and
     determining an energy efficiency cost EEC of local computing based on the energy consumption and the local computing latency;
   calculating an energy efficiency cost EEC of mobile edge computing, wherein the calculating comprises:
     calculating a distance between a vehicle n and a base station BS;
     determining a channel gain between the vehicle n and the base station based on the distance;
     determining a real-time transmission rate from the vehicle n to the base station based on the channel gain;
     determining a task offloading time based on the real-time transmission rate;
     calculating a computing time of an MEC server;
     determining a total latency of mobile edge computing based on the task offloading time and the computing time of the MEC server;
     calculating an energy consumption of mobile edge computing; and
     determining the energy efficiency cost EEC of mobile edge computing based on the energy consumption of mobile edge computing and the total latency of mobile edge computing;
   determining an optimal offloading decision based on the energy efficiency cost of local computing and the energy efficiency cost of mobile edge computing, wherein the determining adopts the following formula:

$$a_n^* = \begin{cases} 1, & \text{if } \text{Cost}_n^o < \text{Cost}_n^l \ \& \ T_n^o < c_n \\ 0, & \text{otherwise} \end{cases}$$

where $a_n^*$ represents the optimal offloading decision, $$c_n \triangleq \frac{\sqrt{R_{max}^2 - D^2} - x_n}{v_n}$$

represents a maximum communication time between the vehicle and the base station, $R_{max}$ represents a maximum communication coverage of the base station BS, D represents a vertical distance between the base station and a road, $x_n$ represents an initial position of the vehicle n on the road, $v_n$ represents a moving speed of the vehicle $$n, \text{Cost}_n^l \triangleq Z_n^l + \lambda_n \frac{L_n C_n}{f_n^l}$$

represents a computing cost of local computing, $$\text{Cost}_n^o \triangleq Z_n^o + \lambda_n \left( t_n^{ot} + \frac{L_n C_n}{f_{MEC}} \right)$$

represents a computing cost of mobile edge computing, $\lambda_n$ represents a Lagrange multiplier corresponding to the latency constraint $(1-a_n)T_n^l + a_n T_n^o \leq T_{n,max}$, $a_n$ represents a decision variable, $T_{n,max}$ represents a maximum tolerable latency, $L_n$ represents a data size of a task $R_n$, $C_n$ represents the computational complexity of the task $R_n$, $f_n^l$ represents a computing speed of the vehicle n, $T_n^l$ represents the local computing latency, $T_n^o$ represents the total latency of mobile edge computing, $Z_n^o$ represents the energy efficiency cost EEC of mobile edge computing, and $Z_n^l$ represents the energy efficiency cost EEC of local computing;

determining an optimal CPU frequency and an optimal transmit power of the vehicle based on the optimal offloading decision, where the determining comprises:
when $a_n^*=0$, determining the optimal CPU frequency of the vehicle by the following formula:

$$f_n^{l*} = \begin{cases} \sqrt[3]{\frac{\beta_n^T + \lambda_n}{2\beta_n^E k}}, & \text{if } 0 \leq \sqrt[3]{\frac{\beta_n^T + \lambda_n}{2\beta_n^E k}} \leq f_{n,max}^l \\ f_{n,max}^l, & \text{otherwise} \end{cases}$$

where $f_{n,max}^l$ represents a maximum CPU frequency of the vehicle n, $f_n^{l*}$-represents the optimal CPU frequency of the vehicle, $\beta_n^T$ represents a latency weight parameter, $\lambda_n$ represents a Lagrange multiplier corresponding to a latency constraint, $\beta_n^E$ represents an energy consumption weight factor, and k represents an effective switched capacitor coefficient, when $a_n^*=1$, determining the optimal transmit power of vehicle n by the following formula:

$$p_n^* = \begin{cases} 0, & \text{if } \hat{p}_n < 0 \\ \hat{p}_n, & \text{if } 0 \leq \hat{p}_n \leq p_{n,max} \\ p_{n,max}, & \text{if } \hat{p}_n > p_{n,max} \end{cases}$$

where $p_{n,max}$ represents a maximum transmit power of the vehicle n, $\hat{p}_n$ is the unique solution of the equation $\beta_n^E t_n^{ot} - \chi_n \varphi'(p_n, t_n^{ot}) = 0$, $\chi_n$ represents a Lagrange multiplier corresponding to the constraint $$a_n L_n \leq \varphi(p_n, T_n^{ot}), \varphi(p_n, t_n^{ot}) \triangleq \int_0^{t_n^{ot}} r_n(\tau)d\tau,$$

$$\varphi'(p_n, t_n^{ot}) \triangleq \frac{\partial \varphi(p_n, t_n^{ot})}{\partial p_n}, t_n^{ot}$$

represents a task transmission time, $p_n>0$ represents a transmit power of the vehicle n, and $r_n(t)$ represents a real-time transmission rate from the vehicle n to the base station;

determining an optimal offloading time of the vehicle based on the optimal CPU frequency and the optimal transmit power of the vehicle, wherein determining the optimal offloading time comprises:
determining the cost function; wherein the cost function is the energy efficiency cost function for the vehicle to complete the computing task, and wherein determining the cost function adopts the following formula:

$$\zeta(t_n^{ot}) = \sum_{n=1}^{N} \left\{ \begin{array}{l} \beta_n^T \left[(1-a_n^*)\frac{L_n C_n}{f_n^{l*}} + a_n^*\left(t_n^{ot} + \frac{L_n C_n}{f_{MEC}}\right)\right] + \\ \beta_n^E \left[(1-a_n^*)kL_n C_n(f_n^{l*})^2 + a_n^* p_n^* t_n^{ot}\right] \end{array} \right\};$$

where $\beta_n^E$ represents an energy consumption weight factor, $p_n^*$ represents the optimal transmit power of vehicle, and $f_{MEC}$ represents a computing capacity of the MEC server; and determining the optimal offloading time of the vehicle using a one-dimensional linear search method based on the cost function.

2. The energy-efficient optimized computing offloading method for a vehicular edge computing network according to claim 1,
wherein calculating the local computing latency adopts the following formula:

$$T_n^l = \frac{L_n C_n}{f_n^l}$$

where $f_n^l$ represents a CPU frequency of the vehicle n, $L_n$ represents a data size of the task $R_n$, and $C_n$ represents a computational complexity of the task $R_n$;

wherein determining the energy consumption of local computing based on the local computing latency adopts the following formula:

$$E_n^l = kT_n^l(f_n^l)^3 = kL_n C_n(f_n^l)^2$$

where k represents effective switching capacitance coefficient, $T_n^l$ represents the local computing latency, $f_n^l$ represents the CPU frequency of the vehicle n, $L_n$ represents the data size of the task $R_n$, and $C_n$ represents the computational complexity of the task $R_n$; and wherein determining the energy efficiency cost EEC of local computing based on the energy consumption and latency of local computing adopts the following formula:

$$Z_n^l = \beta_n^T T_n^l + \beta_n^E E_n^l$$

where $0 \leq \beta_n^T \leq 1$ and $0 \leq \beta_n^E \leq 1$ represent weight factors of latency and energy consumption, respectively, $T_n^l$ represents the latency of local computing, and $E_n^l$ represents the energy consumption of local computing.

3. The energy-efficient optimized computing offloading method for a vehicular edge computing network according to claim 1,
wherein calculating the distance between the vehicle n and the base station BS adopts the following formula:

$$d_n(t) = \sqrt{H^2 + D^2 + (x_n + v_n t)^2}$$

where H represents an antenna height of the base station, D represents the vertical distance between the base station and the road, $x_n$ represents the initial position of the vehicle n on the road, and $v_n$ represents the moving speed of the vehicle n;

wherein determining the channel gain between the vehicle n and the base station based on the distance adopts the following formula:

$$G_n(t) = \beta_0 d_n(t)^{-\theta} = \frac{\beta_0}{[H^2 + D^2 + (x_n + v_n t)^2]^{\frac{\theta}{2}}}$$

where $\beta_0$ represents a gain at a reference distance $d_0=1$ m, and $\theta$ represents a path loss factor of a V2I link;

wherein determining the real-time transmission rate from the vehicle n to the base station based on the channel gain adopts the following formula:

$$r_n(t) = W\log_2\left(1 + \frac{p_n G_n(t)}{\sigma^2}\right)$$

$$= W\log_2\left(1 + \frac{p_n \rho_0}{[H^2 + D^2 + (x_n + v_n t)^2]^{\frac{\theta}{2}}}\right)$$

where W represents a channel bandwidth, $p_n>0$ represents the transmit power of the vehicle n, $\rho_0=\beta_0/\sigma^2$, $\sigma^2$ represents a noise power of a BS receiver, and $G_n(t)$ represents the channel gain between the vehicle n and the base station;

wherein determining task offloading time based on the real-time transmission rate adopts the following formula:

$$\int_0^{t_n^{ot}} r_n(t)dt = L_n$$

where $t_n^{ot}$ represents the task offloading time, $L_n$ represents the data size of the task $R_n$, and $r_n(t)$ represents the real-time transmission rate from the vehicle n to the base station;

wherein calculating the computing time of the MEC server adopts the following formula:

$$t_n^{oe} = \frac{L_n C_n}{f_{MEC}}$$

where $f_{MEC}$ represents the computing capacity of the MEC server, and $C_n$ represents the computational complexity of the task $R_n$;

wherein determining the total latency of mobile edge computing based on the task offloading time and the computing time of the MEC server adopts the following formula:

$$T_n^o = t_n^{ot} + t_n^{oe}$$

where $t_n^{oe}$ represents the computing time of the MEC server, and $t_n^{ot}$ represents the task offloading time;

wherein calculating the energy consumption of mobile edge computing adopts the following formula:

$$E_n^o = p_n t_n^{ot}; \text{ and}$$

wherein determining the energy efficiency cost EEC of mobile edge computing based on the energy consumption of mobile edge computing and the total latency of mobile edge computing adopts the following formula:

$$Z_n^o = \beta_n^T T_n^o + \beta_n^E E_n^o$$

where $T_n^o$ represents the total latency of mobile edge computing, $E_n^o$ represents the energy consumption of mobile edge computing, $\beta_n^T$ represents a latency weight factor, and $\beta_n^E$ represents the energy consumption weight factor.

4. The energy-efficient optimized computing offloading method for a vehicular edge computing network according to claim 1, wherein
determining the optimal offloading time of the vehicle using a one-dimensional linear search method based on the cost function adopts the following formula:

$$\min_{t_n^{ot}} \zeta(t_n^{ot})$$

$$\text{s.t. } 0 \le t_n^{ot} \le c_n$$

where $c_n$ represents the maximum communication time between the vehicle and the BS, $t_n^{ot}$ represents the task offloading time, and $\zeta(t_n^{ot})$ represents the energy efficiency cost function for the vehicle to complete the calculation task.

5. An energy-efficient optimized computing offloading system in a vehicular edge computing network, the system comprising:
a module for calculating energy efficiency cost of local computing, which is configured to:
calculate a local computing latency;
determine an energy consumption of local computing based on the local computing latency; and
determine the energy efficiency cost EEC of local computing based on the energy consumption of local computing;
a module for calculating energy efficiency cost of mobile edge computing, which is configured to:
calculate a distance between a vehicle n and a base station BS;
determine a channel gain between the vehicle n and the base station based on the distance;
determine a real-time transmission rate from the vehicle n to the base station based on the channel gain;
determine task offloading time based on the real-time transmission rate;
calculate a computing time of an MEC server;
determine a total latency of mobile edge computing based on the task offloading time and the computing time of the MEC server;
calculate an energy consumption of mobile edge computing; and
determine the energy efficiency cost EEC of mobile edge computing based on the energy consumption of mobile edge computing and the total latency of mobile edge computing;
an optimal offloading decision determining module, which is configured to:
determine an optimal offloading decision based on the energy efficiency cost of local computing and the energy efficiency cost of mobile edge computing according to the following formula:

$$a_n^* = \begin{cases} 1, \text{ if } Cost_n^o < Cost_n^l \quad \& T_n^o < c_n \\ 0, \quad \text{otherwise} \end{cases}$$

where $a_n^*$ represents the optimal offloading decision, $$c_n \triangleq \frac{\sqrt{R_{max}^2 - D^2} - x_n}{v_n}$$

represents a maximum communication time between the vehicle and the base station, $R_{max}$ represents a maximum communication coverage of the base station BS, D represents a vertical distance between the base station and a road, $x_n$ represents an initial position of the vehicle n on the road, $v_n$ represents a moving speed of the vehicle n, $$Cost_n^l \triangleq Z_n^l + \lambda_n \frac{L_n C_n}{f_n^l}$$

represents a computing cost of local computing, $$Cost_n^o \triangleq Z_n^o + \lambda_n \left( t_n^{ot} + \frac{L_n C_n}{f_{MEC}} \right)$$

represents a computing cost of mobile edge computing, $\lambda_n$ represents a Lagrange multiplier corresponding to the latency constraint $(1-a_n)T_n^l + a_n T_n^o \leq T_{n,max}$, $a_n$ represents a decision variable, $T_{n,max}$ represents a maximum tolerable latency, $L_n$ represents a data size of the task $R_n$, $C_n$ represents a computational complexity of the task $R_n$, $f_n^l$ represents a computing speed of the vehicle n, $T_n^l$ represents the local computing latency, $T_n^o$ represents the total latency of mobile edge computing, $Z_n^o$ represents the energy efficiency cost EEC of mobile edge computing, and $Z_n^l$ represents the energy efficiency cost EEC of local computing;

an optimal CPU frequency and optimal transmit power determining module, which is configured to:
 determine an optimal CPU frequency and an optimal transmit power of the vehicle based on the optimal offloading decision, wherein:
 when $a^*_n=0$, determine the optimal CPU frequency of the vehicle by the following formula:

$$f_n^{l*} = \begin{cases} \sqrt[3]{\frac{\beta_n^T + \lambda_n}{2\beta_n^E k}}, & \text{if } 0 \leq \sqrt[3]{\frac{\beta_n^T + \lambda_n}{2\beta_n^E k}} \leq f_{n,max}^l \\ f_{n,max}^l, & \text{otherwise} \end{cases}$$

where $f_{n,max}^l$ represents a maximum CPU frequency of the vehicle n, $f_n^{l*}$ represents the optimal CPU frequency of the vehicle, $\beta_n^T$ represents a latency weight parameter, $\lambda_n$ represents a Lagrange multiplier corresponding to a latency constraint, $\beta_n^E$ represents an energy consumption weight factor, and k represents an effective switched capacitor coefficient;

when $a^*_n=1$, determine the optimal transmit power of vehicle n by the following formula:

$$p_n^* = \begin{cases} 0 & \text{if } \hat{p}_n < 0 \\ \hat{p}_n, & \text{if } 0 \leq \hat{p}_n \leq p_{n,max} \\ p_{n,max}, & \text{if } \hat{p}_n > p_{n,max} \end{cases}$$

where $p_{n,max}$ represents a maximum transmit power of the vehicle n, $\hat{p}_n$ is a unique solution of the equation $\beta_n^E t_n^{ot} - \chi_n \varphi'(p_n, t_n^{ot}) = 0$, $\chi_n$ represents a Lagrange multiplier corresponding to the constraint $a_n L_n \leq \varphi$ $(p_n, T_n^{ot})$, $\varphi(p_n, t_n^{ot}) \triangleq \int_0^{t_n^{ot}} r_n(\tau) d\tau$, $$\varphi'(p_n, t_n^{ot}) \triangleq \frac{\partial \varphi(p_n, t_n^{ot})}{\partial p_n},$$

$t_n^{ot}$ represents a task transmission time, $p_n>0$ represents a transmit power of the vehicle n, and $r_n(t)$ represents a real-time transmission rate from the vehicle n to the base station;

an optimal offloading time determining module, which is configured to:
 determine the optimal offloading time of the vehicle based on the optimal CPU frequency and the optimal transmit power of the vehicle;
 determine the cost function, wherein the cost function is the energy efficiency cost function for the vehicle to complete the calculation task, and wherein determining the cost function adopts the following formula:

$$\zeta(t_n^{ot}) = \sum_{n=1}^{N} \left\{ \begin{array}{l} \beta_n^T \left[ (1-a_n^*) \frac{L_n C_n}{f_n^{l*}} + a_n^* \left( t_n^{ot} + \frac{L_n C_n}{f_{MEC}} \right) \right] + \\ \beta_n^E \left[ (1-a_n^*) k L_n C_n (f_n^{l*})^2 + a_n^* p_n^* t_n^{ot} \right] \end{array} \right\};$$

where $\beta_n^T$ represents a latency weight factor, $p^*_n$ represents the optimal transmit power of the vehicle, and $f_{MEC}$ represents a computing capacity of the MEC server; and
 determine the optimal offloading time of the vehicle using a one-dimensional linear search method based on the cost function.

* * * * *